3,476,949
ELECTRIC FUEL PUMP CONTROLS
Richard P. Ballou, Howell, Mich., assignor to General Motors Corporation, Detroit, Mich., a corporation of Delaware
Filed Dec. 22, 1967, Ser. No. 692,734
Int. Cl. H02p 9/04; F02n 11/00
U.S. Cl. 290—36                  5 Claims

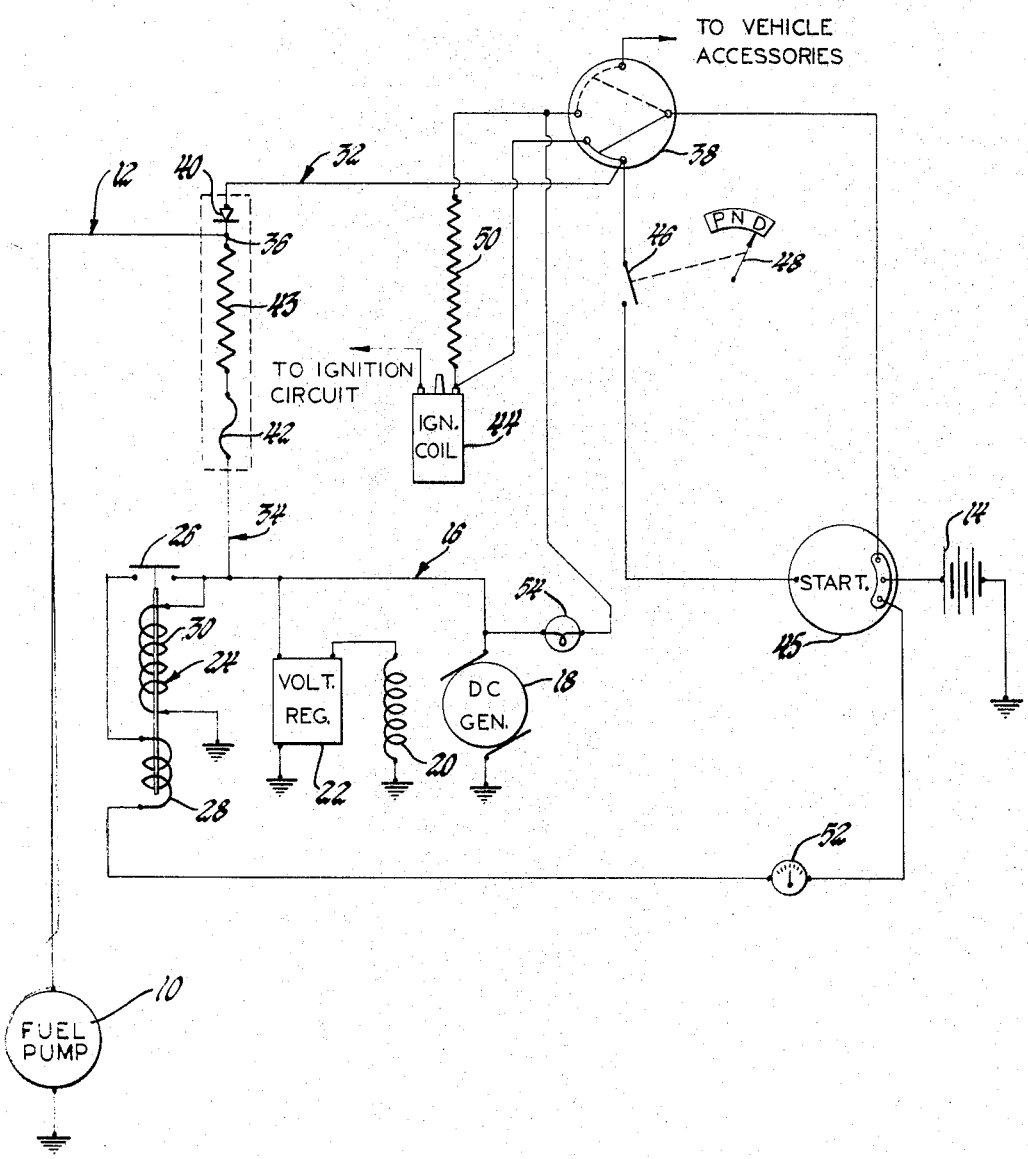

ABSTRACT OF THE DISCLOSURE

A vehicle electric fuel pump control employing the vehicle's DC generator circuitry for connecting the fuel pump either to the battery when the engine is being started or to the DC generator's output when the engine is operating. The vehicle's transmission selector operated neutral switch is also employed to permit selective operation of the fuel pump without the engine operating or being cranked.

---

This invention relates to controls for electric fuel pumps adapted, although not exclusively, for use with engine-driven vehicles.

When an electric fuel pump is utilized to supply fuel to an engine, provision must be made for supplying power to the fuel pump both when the engine is running and when the engine is being cranked. Also, if the engine becomes inoperative for some reason, such as a malfunction or the operator turns the engine off, the power to the fuel pump must be turned off. These operations have been accomplished in various ways, usually necessitating a substantial modification of existing power generating systems. Then too, numerous, relatively expensive components have been employed. All of this increases the cost from an original equipment standpoint as well as from a service standpoint.

Accordingly, a new and different electric fuel pump control is contemplated that can be easily and conveniently incorporated in a conventional vehicle DC generator-operated power system with a minimum of alteration of the system. Further contemplated is an electric fuel pump control that can utilize existing components of a conventional DC generator-operated power system. Also contemplated is an electric fuel pump control that employs a minimum number of components, all of which can be made integral with the fuel pump itself if desired.

An electric fuel pump control is also proposed that operates the fuel pump both when the engine is being cranked and when the engine is operating, but quickly stops pump operation when the engine is stopped and that permits the fuel pump to be selectively operated without either the engine running or being cranked so that depleted fuel lines can be refilled.

Briefly, according to one embodiment of the invention, a vehicle electric fuel pump has a power supply circuit with parallel battery supply and DC generator supply branches that extend respectively to the battery and to the DC generator. When the engine is being cranked, the ignition switch connects the battery supply branch to the electric fuel pump and when the engine is operating, the ignition switch connects the DC generator supply branch to the electric fuel pump. In the event the engine stops operating, the DC generator's cutout relay disconnects the electric fuel pump from the battery, and the generator voltage drops to zero. Hence, no power is available to operate the electric fuel pump and it stops. Provision in the form of a neutral switch permits the electric fuel pump to be selectively connected to the battery without the engine being cranked so that depleted fuel lines can, when necessary, be refilled prior to engine cranking.

The foregoing and other objects and advantages of the invention will become apparent from the following description and from the accompanying drawing in which the single figure illustrates schematically an electric control system for a vehicle electric fuel pump.

Referring now to the details of the figure, the numeral 10 denotes an electric fuel pump suitable for supplying fuel to a motor vehicle engine. The fuel pump 10 is driven by a DC motor and may be of the type disclosed in the United States application Ser. No. 645,150 to Shultz et al., filed June 12, 1967. The DC power for operating the fuel pump 10 is provided by a power supply circuit, designated generally at 12. This power supply circuit 12 connects the fuel pump 10, as will be explained, either to a vehicle battery 14, which may be a conventional twelve-volt battery, or to a DC generator-operated system, denoted generally at 16. As will be explained, this DC power is provided when the engine is being cranked, when the engine is operating, and can be supplied prior to engine cranking should the fuel lines be depleted for some reason, but is always cut off whenever the engine stops.

The DC generator-operated power system 16 may be of any conventional type, such as that commercially available from the Delco-Remy Division of General Motors Corporation. Briefly and for purposes of understanding the invention, the DC generator-operated system 16 includes a DC generator 18 having a field coil 20 and a voltage regulator 22. The voltage regulator 22 operates in a well known way; i.e., similar to a magnetic switch. The voltage regulator 22 responds to the output from the DC generator 18 and, if excessive or above the selected operating voltage, shunts the field coil energizing current either through a voltage dropping resistor or to ground so that the DC generator's output is decreased.

The system 16 also includes a cutout relay 24. The cutout relay 24 has contacts 26, a current winding 28 and a voltage winding 30. When the DC generator 18 is operating, its output energizes the voltage winding 30 and the resultant magnetism will close the contacts 26. The closed contacts 26 also connect the output from the DC generator 18 to the battery 14. Consequently, the current from the DC generator 18 flows through the current winding 28 and to the battery 14. Because of the structure of the current winding 28, the current flowing in this direction adds to the magnetism provided by the energization of the voltage winding 30 so as to continue to hold the contacts 26 closed. When the output of the DC generator 18 diminishes or stops and the voltage from the battery 14 becomes greater than the output voltage from the DC generator 18, the current will flow from the battery 14 through the current winding 28 in the opposite direction, but through the voltage winding 30 in the same direction. The total magnetic field is now inadequate to maintain the contacts 26 closed and they will open, interrupting the circuit connection between the battery 14 and the DC generator 18. This prevents the battery 14 from discharging through the DC generator 18 and, as will become more apparent, cuts off power to the fuel pump 10.

The power supply circuit 12 has two parallel branches, designated as a battery supply branch 32 and a DC generator supply branch 34. These branhces 32 and 34 have a common junction at 36 and extend therefrom respectively to the battery 14 and to the DC generator-operated power system 16.

An engine operating or ignition switch 38 is included in the battery supply branch 32 along with a one-way conducting device, such as a rectifier 40. The rectifier 40 may be of any suitable type; e.g., a gas tube, a metallic rectifier, a semiconductor diode, or a vacuum tube. The ignition switch 38 is typical of those commercially available and includes an engine starting or cranking setting, depicted in the solid line; an engine operating or running setting, depicted in the broken line; and a vehicle accessory operating setting in which the switch 38 connects the battery 14 only to the indicated vehicle accessories, which could include the radio, the various lamps, etc. The ignition switch 38 also has an off setting in which the battery 14 is disconnected from all of the vehicle circuits.

The DC generator supply branch 34 has an appropriate protective fuse 42 and an impedance, such as a resistor 43, that serves a dual purpose. The resistor 43 reduces the voltage developed by the DC generator 18 to match the requirements of the electric fuel pump 10. In addition to the voltage dropping function, the resistor 43 serves as a limiter for the reverse current that tends to flow therethrough when the engine is being cranked and, as will be explained, power is being supplied from the battery 14 by way of the battery supply branch 32.

The fuel pump control provides for four different operating conditions. These occur when the engine is being cranked, when the engine is operating, when the engine is operating and subsequently is stopped or stalls for some reason, and when the fuel lines have become depleted due to the vehicle having run out of gas.

When the engine is to be cranked the ignition switch 38 is moved to the engine cranking setting. In this setting the vehicle's ignition circuit, including an ignition coil 44, is connected to the vehicle battery 14. Also in this setting the battery 14 is connected through the ignition switch 38 to a conventional engine starter, shown generally at 45. If the vehicle has an automatic transmission, there will be included a neutral switch 46, which is only closed when the transmission's selector 48 is in the park or neutral setting. Therefore, the engine starter 45 can only be operated with the neutral switch 46 closed. While the engine is being cranked by the engine starter 45, the battery supply branch 32 is connected in the engine cranking setting of the ignition switch 38 to the battery 14 and will supply the power for energizing the electric fuel pump 10. As mentioned, this battery current from the battery 14 will not in any significant quantity flow into the DC generator branch 34 due to the current limiting function of the resistor 43.

Once the engine is started, the ignition switch 38 is moved to its engine operating, broken line setting and current will be supplied by the battery 14 through an ignition dropping resistor 50, which has the well known function of permitting the ignition coil to be designed for about one-half normal system voltage so that the low voltage which prevails during difficult cranking will still be adequate to start the engine. The engine starter 45 in the ignition engine operating setting is disconnected from the battery 14 and, therefore, is deenergized. Also, the battery supply branch 32 is disconnected from the battery 14. With the engine running, the DC generator 18 is being driven and develops a DC output, which is supplied by way of the DC generator supply branch 34 to the electric fuel pump 10 to maintain it operative while the engine is running. The output from the DC generator 18 is also supplied to the cutout relay 24 and thereby closes the contacts 26. These closed contacts connect the battery 14 to the output of the DC generator 18 so that the battery 14 can be supplied with charging current, which proceeds through an ammeter, shown generally at 52, until the battery 14 is fully charged. A generator indicator lamp 54 will turn off when DC generator 18 is operating because the same potential will be applied to each side. The voltage regulator 22, as explained, continues to operate to prevent the DC output from exceeding some selected maximum voltage, which may be approximately fourteen volts. The current flow from the DC generator supply branch 34 is blocked from the battery supply branch 32 by the action of the rectifier 40 and thus current is prevented from flowing through the battery supply branch 32 to the engine starter 45 in the event that the neutral switch 46 is closed at any time the vehicle is stationary in either the park or neutral setting and the engine is operating.

When the engine is stopped or stalls, the output of the DC generator 18 rapidly decreases until the cutout relay 24 is deenergized and the contacts 26 open. This cuts off the battery 14 from the DC generator supply branch 34 so that the battery power cannot be supplied to the electric fuel pump 10 and, of course, the output from the DC generator 18 will cease when the engine stops. Consequently, the electric fuel pump 10 has no source of power and will properly stop to avoid any problems that might be encountered with the electric fuel pump 10 continuing operation while the vehicle's engine is stopped. The battery supply branch 32, of course, is disconnected from the battery 14 because the ignition switch 38 is in the engine operating position.

In the event that the DC generator 18 should lose field excitation with the engine running; e.g., because of low engine speed or a malfunction of either the cutout relay 24 or the voltage regulator 22, the DC generator 18, because of the residual magnetism in the field, will continue to develop an output although reduced. Because the DC generator supply branch always maintains the connection between the output of the DC generator 18 and the electric fuel pump 10, this reduced output is supplied to the electric fuel pump 10 and is adequate to operate the electric pump 10 so that enough fuel is supplied to keep the engine running until repairs can conveniently be made.

If the fuel lines have become depleted because the fuel tank was allowed to become empty or the vehicle has been stationary for a substantial length of time, the engine will not start until these fuel lines are replenished with fuel. To do this the driver can move the transmission selector 48 to the drive setting to open the neutral switch 46. Then the ignition switch 38 is moved to the engine cranking setting to connect the battery supply branch 32 to the battery 14. In this setting power for energizing the electric fuel pump 10 is provided, but because the neutral switch 46 is open the engine starter 45 receives no power and will not crank the engine. This momentary operation of the electric fuel pump 10 will fill the depleted fuel lines so that when the neutral switch 46 is moved to closed position the engine starter 45 can be energized.

As will now be appreciated, the control provides all of the basic operations for the electric fuel pump 10 while involving a minimum number of components and is easily made a part of an existing DC generator-operated system. No pressure switch for these purposes is required nor are additional switches or relays required. Furthermore, the rectifier 40, the resistor 43 and the fuse 42 can all be in a unitary package and made integral with some part of the electric fuel pump 10 itself. Therefore, all that is needed are the connections from the DC generator-operated power system 16 and from the ignition switch 38.

The invention is to be limited only by the following claims.

What is claimed is:

1. An electric fuel pump control comprising, in combination, an electric fuel pump; a DC source; a DC generator-operated power system including a DC generator and a relay operative in response to the outputs from both the DC source and the DC generator to connect the DC source to the DC generator output when the DC generator is developing an output of a certain level for operating the electric fuel pump and to disconnect the DC source from the output of the DC generator when the DC generator output is below the certain level; a fuel pump power supply circuit extending to the DC generator and to the DC source; the relay being arranged when the DC generator output is below the certain level and the output of the DC generator is disconnected from the DC source to also prevent power from being supplied by the DC source to the electric fuel pump and thereby stop operation of the electric fuel pump.

2. An electric fuel pump control comprising, in combination, an electric fuel pump; a DC source; a DC generator-operated power system including a DC generator driven by the engine and a cutout relay operative in response to the outputs from both the DC source and the DC generator to connect the DC source to the DC generator output when the DC generator is developing an output of a certain level and to disconnect the DC source from the output of the DC generator when the DC generator output is below the certain level; a power supply circuit for the electric fuel pump; the power supply circuit having parallel DC generator supply and DC source supply branches respectively extending to the DC generator and to the DC source; the DC generator supply branch including a resistance for establishing the voltage supplied by the DC generator to the electric fuel pump and for limiting reverse current flow to the DC generator-operated power system from the DC source supply branch; the DC source supply branch including a one-way conducting device so poled as to permit current flow from the DC source supply branch to the electric fuel pump and to prevent current flow from the DC generator supply branch to the DC source supply branch when the DC generator-operated power system is operative; the cutout relay being arranged when the DC generator output is below the certain level and the output of the DC generator is disconnected from the DC source to also prevent power from being supplied by the DC source to the DC generator or by way of the DC generator supply branch to the electric fuel pump and thereby stop operation of the electric fuel pump.

3. An electric fuel pump control for an engine-driven vehicle comprising, in combination, an electric fuel pump; a battery; a DC generator-operated power system including a DC generator driven by the engine and a cutout relay operative in response to the outputs from both the battery and the DC generator to connect the battery to the DC generator output when the DC generator is developing an output of a certain level and to disconnect the battery from the output of the DC generator when the DC generator output is below the certain level; a power supply circuit for the electric fuel pump; the power supply circuit having parallel DC generator supply and battery supply branches respectively extending to the DC generator and to the battery; the DC generator supply branch including a resistance for establishing the voltage supplied by the DC generator to the electric fuel pump and for limiting reverse current flow to the DC generator-operated power system from the battery supply branch; the battery supply branch including an engine operating switch having an engine operating setting in which the battery supply branch is disconnected from the battery and an engine starting setting in which the battery supply branch is connected to the battery so as to energize the electric fuel pump when the engine is being started and a one-way conducting device so poled as to permit current flow from the battery supply branch to the electric fuel pump when the engine operating switch is in the engine starting setting and to pevent current flow from the DC generator supply branch to the battery supply branch when the DC generator-operated power system is operative; the cutout relay being also operative when the DC generator output is below the certain level and the output of the DC generator is disconnected from the battery to also prevent power from being supplied to the DC generator or by the battery by way of the DC generator supply branch to the electric fuel pump or to the DC generator and thereby cause operation of the electric fuel pump to be stopped.

4. In combination; an electric fuel pump for an engine-driven vehicle having a transmission and an engine starter; a battery; a DC generator-operated power system including an engine-driven DC generator and a cutout relay operative in response to the outputs from the battery and the DC generator to connect the battery to the output of the DC generator when the DC generator is developing a certain output and to disconnect the battery from the output of the DC generator when the DC generator output is below the certain level; a power supply circuit for the electric fuel pump; the power supply circuit having parallel DC generator supply and battery supply branches extending respectively to the DC generator and the battery; the battery supply branch including an engine operating switch having an engine operating setting in which the battery supply branch is disconnected from the battery and an engine starting setting in which the battery supply branch is connected to the battery so as to energize the electric fuel pump when the engine is being started; a transmission selector-operated switch for respectively connecting the engine operating switch to the starter in the transmission neutral setting thereof and disconnecting the engine operating switch from the starter in a transmission drive setting thereof; the transmission selector-operated switch being selectively operable when in the transmission drive setting with the engine operating switch in the engine starting setting to energize the electric fuel pump without the engine operating or being started.

5. In combination; an electric fuel pump for an engine-driven vehicle having a transmission and an engine starter; a battery; a DC generator-operated power system including an engine-driven DC generator and a cutout relay operative in response to the outputs from the battery and the DC generator to connect the battery to the output of the DC generator when the DC generator is developing a certain output and to disconnect the battery from the output of the DC generator when the DC generator output is below the certain level; a power supply circuit for the electric fuel pump; the power supply circuit having parallel DC generator supply and battery supply branches extending respectively to the DC generator and the battery; the DC generator supply branch including a resistance for determining the voltage supplied by the DC generator to the electric fuel pump and for limiting reverse current to the DC generator-operated power system from the battery supply branch; the battery supply branch including an engine operating switch having an engine operating setting in which the battery supply branch is disconnected from the battery and an engine starting setting in which the battery supply branch is connected to the battery so as to energize the electric fuel pump when the engine is being started and a one-way conducting device so poled as to permit current flow from the battery supply branch to the electric fuel pump when the engine operating switch is in the engine starting setting and to prevent current flow from the DC generator supply branch to the battery supply branch when the DC generator-operated power system is operative; and a transmission selector-operated switch for respectively connecting the engine operating switch to the starter in the transmission neutral setting thereof and disconnecting the engine operating switch from the starter in a transmission drive setting thereof; the transmission selector-operated switch being selectively operable when in the transmission drive setting with the engine operating switch in the engine starting setting to energize the electric fuel pump without the engine operating or being started.

References Cited

UNITED STATES PATENTS 2,218,847  10/1940  Korte.
2,989,644  6/1961  Schultz _____ 290—36

LAURENCE M. GOODRIDGE, Primary Examiner

U.S. Cl. X.R.
123—179; 290—38